United States Patent [19] [11] 4,384,973
Harnisch [45] May 24, 1983

[54] DIMETHINE COMPOUNDS OF THE COUMARIN SERIES, A PROCESS FOR THEIR PREPARATION AND THEIR USE AS LUMINOUS DYESTUFFS

[75] Inventor: Horst Harnisch, Much, Fed. Rep. of Germany

[73] Assignee: Bayer Aktiengesellschaft, Leverkusen, Fed. Rep. of Germany

[21] Appl. No.: 296,661

[22] Filed: Aug. 27, 1981

[30] Foreign Application Priority Data

Sep. 3, 1980 [DE] Fed. Rep. of Germany ....... 3033159

[51] Int. Cl.$^3$ ............................................. C07F 13/00
[52] U.S. Cl. .......................... 252/301.17; 252/301.35; 252/301.34; 331/94.5 L; 542/430; 542/431; 542/434; 542/436; 542/437; 542/441; 549/287; 549/288
[58] Field of Search ............... 542/430, 434, 436, 431, 542/437, 441; 260/343.44, 343.45; 252/301.17, 301.35, 301.34; 331/94.5 L

[56] References Cited

U.S. PATENT DOCUMENTS

| 4,018,796 | 4/1977 | Harnisch | 542/441 |
| 4,105,665 | 8/1978 | Harnisch . | |
| 4,258,182 | 3/1981 | Beecken | 542/415 |
| 4,268,668 | 5/1981 | Harnisch et al. | 544/225 |
| 4,312,985 | 1/1982 | Hunt | 542/420 |
| 4,316,013 | 2/1982 | Hunt | 542/445 |
| 4,319,024 | 3/1982 | Peeters et al. | 542/426 |

FOREIGN PATENT DOCUMENTS 7508726 3/1975 France .

Primary Examiner—Arthur P. Demers
Attorney, Agent, or Firm—Sprung, Horn, Kramer & Woods

[57] ABSTRACT

Dimethine compounds of the coumarin series of the general formula

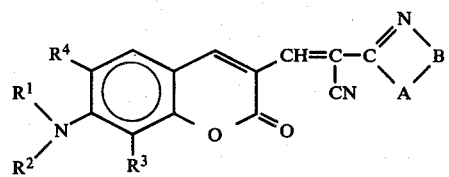

with the substituent meanings given in the description are used for dyeing synthetic fibre materials, in particular those of polyester, polyamide, polyurethanes, polypropylene and polyacrylonitrile. Clear, luminous-red dyeings of high brilliancy are obtained. The dyestuffs can also be used as laser dyestuffs and as energy converters in light-collecting systems.

10 Claims, No Drawings

DIMETHINE COMPOUNDS OF THE COUMARIN SERIES, A PROCESS FOR THEIR PREPARATION AND THEIR USE AS LUMINOUS DYESTUFFS

The invention relates to dimethine dyestuffs of the general formula

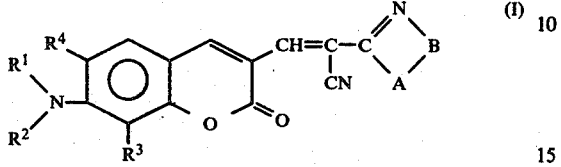

wherein
A denotes O, S, N-alkyl, N-aryl or N-aralkyl,
B denotes the remaining members of a quasiaromatic heterocyclic ring system,
$R^1$ denotes alkyl, alkenyl, cycloalkyl, aralkyl or aryl,
$R^2$ denotes hydrogen, alkyl or aralkyl and
$R^3$ and $R^4$ each denote hydrogen or methyl, and wherein
$R^1$ and $R^2$ together can form a radical of the formula —$(CH_2)_2$—Z—$(CH_2)_2$—,
$R^1$ and $R^4$ together can form a radical of the formula —$(CH_2)_2$—, —$(CH_2)_3$— or —$C(CH_3)_2$—$CH_3$—$CH(CH_3)$— and
$R^2$ and $R^3$ together can form a radical of the formula —$(CH_2)_3$—,
wherein
Z represents A, $CH_2$ or a direct bond, and wherein the cyclic and acyclic radicals can carry substituents which are customary in dyestuff chemistry.

Suitable alkyl radicals $R^1$ and $R^2$ are $C_1$-$C_5$-alkyl radicals, which can carry a substituent such as chlorine, bromine, cyano or $C_1$-$C_4$-alkoxycarbonyl.

By alkenyl there are preferably to be understood $C_3$-$C_4$-alkenyl radicals.

Cycloalkyl radicals which may be mentioned are, above all, cyclohexyl and cyclopentyl.

Suitable aralkyl radicals $R^1$ and $R^2$ are, in particular, phenyl-$C_1$-$C_3$-alkyl radicals.

Z preferably represents O, NH, $NCH_3$, $CH_2$ or a direct bond.

Suitable aryl radicals are, in particular, phenyl radicals, which can be mono-, di- or tri-substituted by methyl, chlorine or $C_1$-$C_2$-alkoxy.

Suitable heterocyclic ring systems which A and B can form, together with

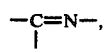

are the benzoxazole, benzimidazole, quinazolone, 1,3,4-oxadiazole and 1,3,4-thiadiazole rings, which can in turn be mono- or di-substituted by $C_1$-$C_4$-alkyl, $CF_3$, $C_1$-$C_4$-alkoxy, halogen, $C_1$-$C_4$-alkoxycarbonyl, COOH, $C_1$-$C_4$-alkylsulphonyl, $C_5$-$C_6$-cycloalkyl, phenyl, phenyl-$C_1$-$C_3$-alkyl or $SO_3H$, it also being possible for 2 adjacent substituents together to form a radical of the formula —$(CH_2)_2$—O—, —$(CH_2)_3$—, —$(CH_2)_4$—, —$OCH_2O$—, —O—$CH_2$—$CH_2$—O— or —$C(CH_3)_2$—$CH_2$—$CH_2$—$C(CH_3)_2$—. The heterocyclic systems can also be benzo-fused.

In the context of the invention, preferred dimethine dyestuffs correspond to the formula

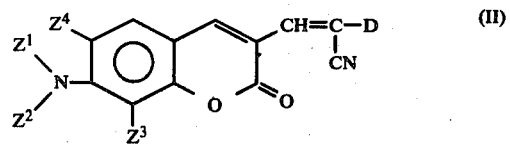

wherein
$Z^1$ and $Z^2$ each by itself represents a $C_1$-$C_4$-alkyl radical which is substituted by Cl or CN, or phenyl-$C_1$-$C_3$-alkyl,
$Z^3$ and $Z^4$ independently of one another represent hydrogen,
D represents a radical of the formula

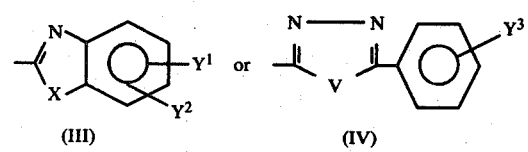

X represents O, S, NH, N-$C_1$-$C_4$-alkyl, N-benzyl, N-phenyl or NH—CO (CO on the aromatic ring),
V represents O or S,
$Y^1$ represents hydrogen, $C_1$-$C_4$-alkyl, chlorine, $C_1$-$C_4$-alkoxy, $C_1$-$C_4$-alkoxycarbonyl, $C_1$-$C_4$-alkylsulphonyl, phenyl or cyclohexyl,
$Y^2$ represents hydrogen, methyl or chlorine and
$Y^3$ represents hydrogen, $C_1$-$C_4$-alkyl, $C_1$-$C_2$-alkoxy or chlorine, and wherein
$Z^1$ and $Z^4$ and $Z^2$ and $Z^3$ together can represent a radical of the formula —$(CH_2)_3$—.
Dimethine dyestuffs of the formula

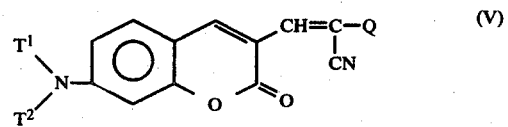

wherein
$T^1$ and $T^2$ each by itself represents $C_1$-$C_4$-alkyl or phenyl-$C_1$-$C_3$-alkyl,
Q represents a radical of the formula

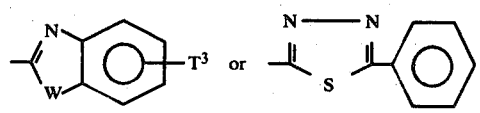

W represents O, S, NH or NH—CO (CO on the aromatic ring) and
$T^3$ represents hydrogen, methyl, methoxy, ethoxy or chlorine, have a particular industrial value.

Compounds of the formula V in which W=O, are particularly preferred.

The invention furthermore relates to a process for the preparation of the dimethane dyestuffs of the formula I. The process is characterised in that aldehydes of the formula

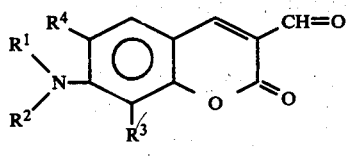 (VIII)

wherein $R^1$, $R^2$, $R^3$ and $R^4$ have the abovementioned meaning, or functional derivatives of these aldehydes, are subjected to a condensation reaction with cyanomethyl compounds of the formula

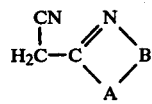 (IX)

wherein

A and B have the abovementioned meaning.

The condensation can be carried out under the customary reaction conditions, such as are described, for example, in U.S. Pat. No. 4,105,665 in an inert organic solvent in the presence of a basic catalyst.

Compounds which are usually employed in the Knoevenagel reaction, such as, for example, ammonia, sodium acetate, potassium carbonate, potassium hydroxide, potassium cyanide, sodium methylate, sodium ethylate or organic nitrogen bases, such as diethylamine, dimethylamine, pyridine or morpholine, can be used as the basic catalysts. Preferred catalysts are piperidine, pyrrolidine and piperidine acetate.

Possible inert organic solvents are both polar solvents and non-polar solvents, it being expedient, if water-immiscible solvents are used, for the water formed during the reaction to be removed from the reaction mixture by azeotropic distillation.

Solvents which are used are, for example: alcohols, such as methanol, ethanol, isopropanol, n-propanol, n-butanol, cyclohexanol, benzyl alcohol, β-phenethyl alcohol, glycol, glycol monomethyl ether, glycol monoethyl ether and β-dimethylaminoethanol; amides, such as formamide, dimethylformamide, dimethylacetamide and N-methylpyrrolidone; dimethylsulphoxide; acetonitrile, dioxane and tetrahydrofuran; and water-immiscible solvents, such as benzene, toluene, xylene or chlorobenzene.

The reaction temperatures can be varied within a wide range, for example from 15° to 150° C.

The starting compounds of the formula VIII and functional derivatives thereof are known (DE-OS (German Published Specification) No. 2,413,281). Particularly suitable functional derivatives of these aldehydes are the compounds first obtained in the preparation of the aldehydes by the Vilsmeier reaction, that is to say the compound obtained before hydrolysis to give the aldehyde, and in particular those which are characterised by the part structure

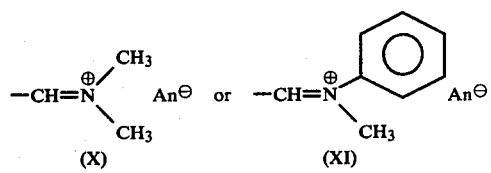

(X) (XI)

wherein $An^\ominus$ denotes an anion, such as $PO_2Cl_2^\ominus$ or $Cl^\ominus$.

The starting compounds of the formula IX are likewise known (DE-AS (German Published Specification) Nos. 1,201,354, 1,207,937, 2,005,933, 2,327,959, 2,632,402 and 2,710,285.

A second process for the preparation of compounds of the formula (I) is characterised in that salicylaldehydes of the formula

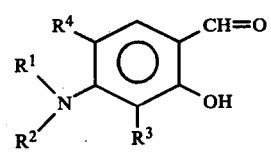 (XII)

wherein $R^1$–$R^4$ have the meaning indicated above are subjected to a condensation reaction with compounds of the formula

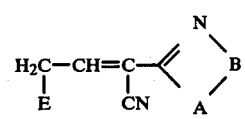 (XIII)

wherein

A and B have the meaning indicated above and E represents the carboxylic acid ester group, the carboxylic acid amide group or the nitrile group with closure of the coumarin ring. Appropriate carboxylic acid ester groups are above all $C_1$–$C_4$ alkyl esters.

The condensation reaction can be carried out in an inert solvent in the presence of a basic catalyst under similar conditions as indicated for the above process.

The starting compounds of the formula XII are known. The starting compounds of the formula XIII are for example prepared by subjecting compounds of the formula IX to a condensation reaction with formylacetic acid derivatives of the formula

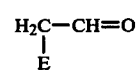 (XIV)

wherein

E has the same meaning as in formula XIII or with derivatives of XIV in which the formyl group is functionally modified.

This condensation reaction is also carried out under the customary basic conditions in one of the above-mentioned inert solvents.

Formylacetic esters, which are in the form of alkali metal salts, may advantageously be subjected to a condensation reaction in a mixture of a polar, water-miscible inert solvent such as ethanol, and also in the presence of water.

The dimethine dyestuffs of the formula I are suitable for dyeing and printing natural, semi-synthetic and synthetic fibre materials and fabrics, for example fibres of polyester, polyamide, polyurethane, cellulose 2½-acetate, cellulose triacetate, polypropylene and polyacrylonitrile.

Very clear dyeings which have luminous-red shades and are distinguished by good fastness properties in use and by a high brilliance are obtained on the fibres and fabrics mentioned, in particular on polyester, with the dyestuffs of the formula I according to the invention.

The warning and signal orange shade RAL 2005 (with a luminous factor $\beta \geq 0.45$ according to DIN 16,954) laid down by the German Standards Sub-Committee for Terms of Delivery and Quality Assurance can advantageously be established by mixing or combining the dyestuffs according to the invention with known 7-di-$C_1$-$C_4$-alkyl)-amino-3-heteryl-coumarin dyestuffs, in which heteryl represents a benzoxazole, benzothiazole, benzimidazole, quinazolone or 5-phenyl-1,3,4-thiadiazole radical which is optionally substituted e.g. by 1 or 2 $C_1$-$C_4$-alkyl radicals, 1 or 2 chlorine atoms, $C_1$-$C_4$-alkoxy, $C_1$-$C_4$-alkylsulphonyl, $C_1$-$C_4$-alkoxycarbonyl, cyclohexyl or phenyl (DE-AS (German Published Specification) Nos. 1,098,125, 1,469,770, 2,005,933, 2,030,507, 2,126,811 and 2,529,434) or with 10-($C_1$-$C_2$-alkoxy)-benzo[k,1]xanthene-3,4-dicarboxylic acid imides, such as are described in DE-AS (German Published Specification) Nos. 1,569,761 and 1,770,818. This shade is of industrial importance for the production of warning clothing, warning and signal signs and sports articles. Such articles with the colour shade RAL 2005 have hitherto been produced exclusively by direct application of a polyamide or polyurethane coating in which fluorescent pigments are embedded to cotton fabric. The disadvantages of inadequate abrasion-resistance and very low fastness to light of the pigment coating are overcome by dyeing hydrophobic fibre materials directly with the above-mentioned mixture or combination.

The dimethine dyestuffs of the formula I are also particularly suitable for colouring plastic compositions, in particular polycarbonate. In these the high heat stability of the compounds of the good light fastness of the fluorescence should be emphasized.

The fluorescent luminous-red dyestuffs of the formula I can also advantageously be used, in a very pure form, as laser dyestuffs and as energy converter in light-collecting systems.

0.001 to 0.01% colourings, especially 0.01% colourings of pure dyestuffs of the formula I, in particular Example 2, are particularly suitable in polycarbonate, such as (R)MAKROLON.

The light collectors can be used with or without additional electronic structural elements.

EXAMPLE 1

24.5 g of 7-diethylamino-coumarin-3-aldehyde, 15.8 g of 2-cyanomethyl-benzoxazole, 250 ml of ethanol and 2 ml of piperidine are heated to the boiling point under reflux for 4 hours and the mixture is then cooled. The crystalline precipitate is filtered off, washed with ethanol, recrystallised from 230 ml of dimethylformamide, washed with ethanol and dried at 70° C. in vacuo. 34.2 g of the compound of the formula

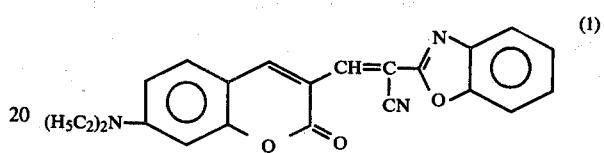

are obtained in the form of a dark red crystalline powder of melting point 268° C. $C_{23}H_{19}N_3O_3$ (385): m/e=385 (M+).

The dyestuff dyes polyester fibres, under high temperature conditions (130° C.), in a luminous-red colour shade which has good fastness properties. For particular purposes, the dyestuff can also be applied to polyester textile materials in accordance with the transfer printing principle in a manner which is in itself known.

The dimethine dyestuffs of the general formula

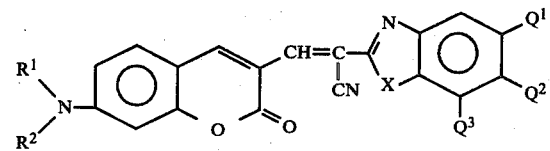

listed in the table which follows are prepared in an analogous manner:

| Example | $R^1$ | $R^2$ | $Q^1$ | $Q^2$ | $Q^3$ | X | Colour shade (polyester) |
|---|---|---|---|---|---|---|---|
| (2) | $C_2H_5$ | $C_2H_5$ | Cl | H | H | O | red |
| (3) | $C_2H_5$ | $C_2H_5$ | $CH_3$ | H | H | O | red |
| (4) | $C_2H_5$ | $C_2H_5$ | Cl | H | Cl | O | red |
| (5) | $C_2H_5$ | $C_2H_5$ | $C(CH_3)_3$ | H | H | O | red |
| (6) | $C_2H_5$ | $C_2H_5$ | $C(CH_3)_3$ | H | $CH_3$ | O | red |
| (7) | $C_2H_5$ | $C_2H_5$ | $CH_3$ | H | $CH_3$ | O | red |
| (8) | $C_2H_5$ | $C_2H_5$ | $CH_3$ | $CH_3$ | H | O | red |
| (9) | $C_2H_5$ | $C_2H_5$ | ⬡ | H | H | O | red |
| (10) | $C_2H_5$ | $C_2H_5$ | ⬡H | H | H | O | red |
| (11) | $C_2H_5$ | $C_2H_5$ | $C_2H_5$—$SO_2$ | H | H | O | red |
| (12) | $C_2H_5$ | $C_2H_5$ | $CH_3OCO$ | H | H | O | red |
| (13) | $C_2H_5$ | $C_2H_5$ | $C_2H_5OCO$ | H | H | O | red |
| (14) | $C_2H_5$ | $C_2H_5$ | $CH_3OCH_2CH_2OCO$ | H | H | O | red |
| (15) | $C_2H_5$ | $C_2H_5$ | n-$C_4H_9OCO$ | H | H | O | red |
| (16) | $C_2H_5$ | $C_2H_5$ | $CH_3O$ | H | H | O | red |
| (17) | n-$C_4H_9$ | n-$C_4H_9$ | $CF_3$ | H | H | O | red |
| (18) | Cl—$CH_2$—$CH_2$ | Cl—$CH_2$—$CH_2$ | Cl | H | H | O | red |

-continued

| Example | R¹ | R² | Q¹ | Q² | Q³ | X | Colour shade (polyester) |
|---|---|---|---|---|---|---|---|
| (19) | NC—CH₂—CH₂ | NC—CH₂—CH₂ | CH₃ | H | H | O | red |
| (20) | C₆H₅—CH₂ | C₆H₅—CH₂ | Cl | H | H | O | red |
| (21) | C₆H₅—CH₂—CH₂ | C₆H₅—CH₂CH₂ | CH₃ | H | H | O | red |
| (22) | CH₃ | CH₃ | Cl | H | H | O | red |
| (23) | —(CH₂)₅— | | H | H | H | O | red |
| (24) | —(CH₂)₂—O—(CH₂)₂— | | Cl | H | H | O | red |
| (25) | —(CH₂)₄— | | cyclohexyl | H | H | O | red |
| (26) | C₆H₅—CH₂ | C₂H₅ | Cl | H | H | O | red |
| (27) | cyclohexyl | CH₃ | Cl | H | H | O | red |
| (28) | C₆H₅ | CH₃ | CH₃ | H | H | O | red |
| (29) | CH₂=CH—CH₂ | CH₂=CH—CH₂ | C₆H₅—C(CH₃)₂— | H | H | O | red |
| (30) | C₂H₅ | C₂H₅ | —(CH₂)₄— | H | O | red | |
| (31) | C₆H₅—CH₂CH₂CH₂ | C₆H₅—CH₂CH₂CH₂ | C₆H₅—CH₂ | H | H | O | red |
| (32) | n-C₃H₆ | n-C₃H₆ | CH₃—SO₂ | H | H | O | red |
| (33) | C₂H₅ | C₂H₅ | n-C₄H₉SO₂ | H | H | O | red |
| (34*) | C₂H₅ | C₂H₅ | CH₃ | H | SO₃⊖HN⊕—pyridinium | O | red |
| (35) | C₂H₅ | C₂H₅ | H | OC₂H₅ | H | S | red |
| (36) | C₆H₅—CH₂ | C₆H₅—CH₂ | H | OCH₃ | H | S | red |
| (37) | C₆H₅—CH₂—CH₂ | C₆H₅—CH₂—CH₂ | H | H | H | S | red |
| (38) | n-C₄H₉ | n-C₄H₉ | H | H | H | S | red |
| (39) | C₂H₅ | C₂H₅ | H | H | H | NH | red |
| (40) | C₆H₅—CH₂ | C₆H₅—CH₂ | Cl | H | H | NH | red |
| (41) | n-C₄H₉ | n-C₄H₉ | H | H | H | NCH₃ | red |
| (42) | CH₃ | CH₃ | CH₃ | H | H | N—C₆H₅ | red |
| (43) | C₂H₅ | C₂H₅ | H | H | H | N—CH₂—C₆H₅ | red |

-continued

| Example | $R^1$ | $R^2$ | $Q^1$ | $Q^2$ | $Q^3$ | X | Colour shade (polyester) |
|---|---|---|---|---|---|---|---|
| (44) | N-$C_4H_9$ | n-$C_4H_9$ | H | H | H | NH—CO (CO on the aromatic ring) | red |
| (44a) | $C_2H_5$ | $C_2H_5$ | H | H | H | S | red |

*Condensation in pyridine instead of ethanol

I claim:

1. A dimethine compound of the formula

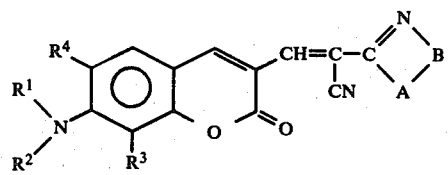

wherein

A and B together with

form a heterocyclic ring system selected from the group consisting of benzoxazole, benzimidazole, quinazolone, 1,3,4-oxadiazole and 1,3,4-thiadiazole rings, optionally benzo-fused and optionally substituted with up to two $C_1$-$C_4$-alkyl, $CF_3$, $C_1$-$C_4$-alkoxy, halogen, $C_1$-$C_4$-alkoxycarbonyl, COOH, $C_1$-$C_4$-alkylsulphonyl, $C_5$-$C_6$-cycloalkyl, phenyl, phenyl-$C_1$-$C_3$alkyl, $SO_3H$, —$(CH_2)_2$—O—, —$(CH_2)_3$—, —$(CH_2)_4$—, —$OCH_2O$—, —O—$CH_2$—$CH_2$—O— and/or —$C(CH_3)_2$—$CH_2C H_2$—$C(CH_3)_2$— radicals;

$R^1$ is $C_1$-$C_5$-alkyl, $C_3$-$C_4$-alkenyl, $C_5$-$C_6$-cycloalkyl, phenyl-$C_{1-5}$-alkyl, or phenyl, $R^2$ is hydrogen, $C_1$-$C_5$-alkyl or phenyl-$C_{1-5}$-alkyl, $R^3$ and $R^4$ each independently is hydrogen or methyl, or $R^1$ and $R^2$ together can form a radical of the formula —$(CH_2)_2$—Z—$(CH_2)_2$—, $R^1$ and $R^4$ together can form a radical of the formula —$(CH_2)_2$—, —$(CH_2)_3$— or —$C(CH_3)_2$—$CH_2$—$CH(CH_3)$— and/or $R^2$ and $R^3$ together can form a radical of the formula —$(CH_2)_3$—, and Z is A, $CH_2$ or a direct bond, and wherein the cyclic and acyclic radicals can carry substituents which are customary in dyestuff chemistry.

2. Dimethine compounds according to claim 1, of the formula

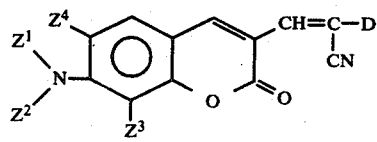

wherein $Z^1$ and $Z^2$ each by itself represents a $C_1$-$C_4$-alkyl radical which is substituted by Cl or CN, or phenyl-$C_1$-$C_3$-alkyl, $Z^3$ and $R^4$ independently of one another represent hydrogen, D represents a radical of the formula

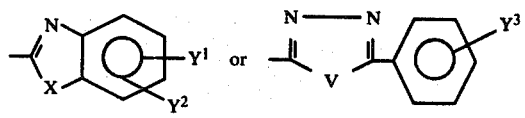

X represents O, S, NH, N-$C_1$-$C_4$-alkyl, N-benzyl N-phenyl

or,

V represents O or S, $Y^1$ represents hydrogen, $C_1$-$C_4$-alkyl, chlorine, $C_1$-$C_4$-alkoxy, $C_1$-$C_4$-alkoxycarbonyl, $C_1$-$C_4$-alkylsulphonyl, phenyl or cyclohexyl, $Y^2$ represents hydrogen, methyl or chlorine and $Y^3$ represents hydrogen, $C_1$-$C_4$-alkyl, $C_1$-$C_2$-alkoxy or chlorine, and wherein $Z^1$ and $Z^4$, and $Z^2$ and $Z^3$ together can represent a radical of the formula —$(CH_2)_3$—.

3. Dimethine compounds according to claim 1, of the formula

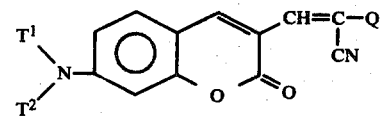

wherein $T^1$ and $T^2$ each by itself represents $C_1$-$C_4$-alkyl or phenyl-$C_1$-$C_3$-alkyl, Q represents a radical of the formula

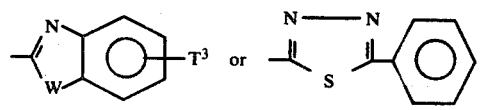

W represents O, S, NH or NH-CO (CO on the aromatic ring) and $T^3$ represents hydrogen, methyl, methoxy, ethoxy or chlorine.

4. Dimethine compounds according to claim 3, characterised in that W=0.

5. Compound of the formula

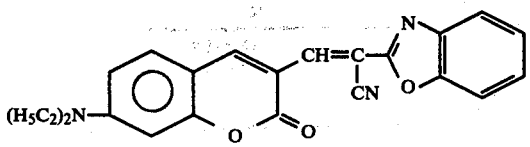

6. Process for the preparation of the dimethine compounds according to claim 1, characterised in that aldehydes of the formula

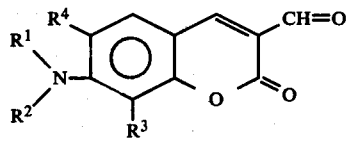

wherein

R$^1$, R$^2$, R$^3$ and R$^4$ have the meaning given, or functional derivatives of these aldehydes, are subjected to a condensation reaction with cyanomethyl compounds of the formula

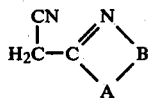

wherein

A and B have the meaning given.

7. Process for the preparation of compounds of the formula (I), characterised in that salicylaldehydes of the formula

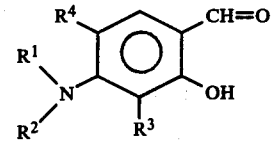

wherein

R$^1$–R$^4$ have the meaning indicated above, are subjected to a condensation reaction with compounds of the formula

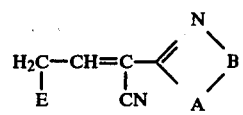

wherein

A and B have the meaning indicated above and E represents a carboxylic acid group, a carboxylic acid amide group or a nitrile group, with closure of the coumarin ring.

8. Mixtures or combinations of dimethine compounds according to claim 1 with 7-di-(C$_1$–C$_4$-alkyl)-amino-3-heteryl-coumarin dyestuffs, in which heteryl represents a benzoxazole, benzothiazole, benzimidazole, quinazolone or 5-phenyl-1,3,4-thiadiazole radical which is optionally substituted by 1 or 2 C$_1$–C$_4$-alkyl radicals, 1 or 2 chlorine atoms, C$_1$–C$_4$-alkoxy, C$_1$–C$_4$-alkylsulphonyl, C$_1$–C$_4$-alkoxycarbonyl, cyclohexyl or phenyl, or with 10-(C$_1$–C$_2$-alkoxy)-benzo[k,1]xanthene-3,4-dicarboxylic acid imides, characterised in that these mixtures or combinations correspond, on polyester, to a luminous orange colour shade in accordance with the Standard RAL 2005 laid down by the German Standards Sub-Committee for Terms of Delivery and Quality Assurance.

9. A luminous dyestuff composition comprising a dimethine compound according to claim 1, plus a carrier.

10. In a system for converting light to another energy form and containing a chemical energy converter, the improvement wherein said converter comprises a dimethine compound according to claim 1.

* * * * *

UNITED STATES PATENT AND TRADEMARK OFFICE
CERTIFICATE OF CORRECTION

PATENT NO. : 4,384,973

DATED : May 24, 1983

INVENTOR(S) : Horst Harnisch

Page 1 of 2

It is certified that error appears in the above-identified patent and that said Letters Patent is hereby corrected as shown below:

Column 9, after line 13, the formulas should be inserted as shown on the attached sheet.

Signed and Sealed this

Twenty-seventh Day of September 1983

[SEAL]

Attest:

GERALD J. MOSSINGHOFF

Attesting Officer

Commissioner of Patents and Trademarks

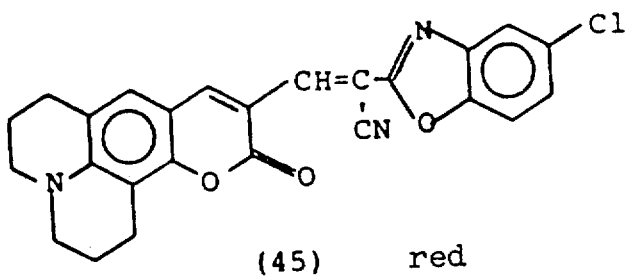
(45)  red
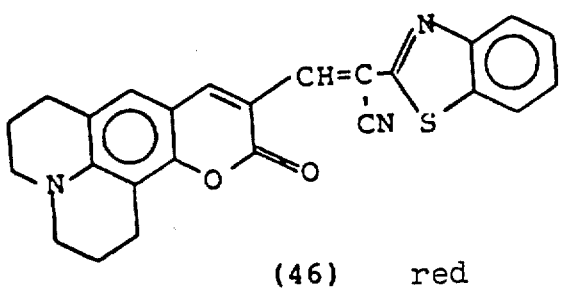
(46)  red
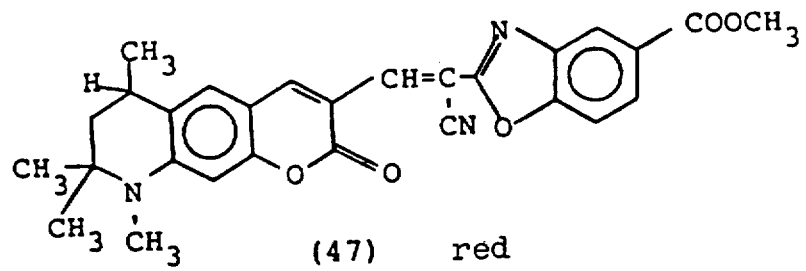
(47)  red
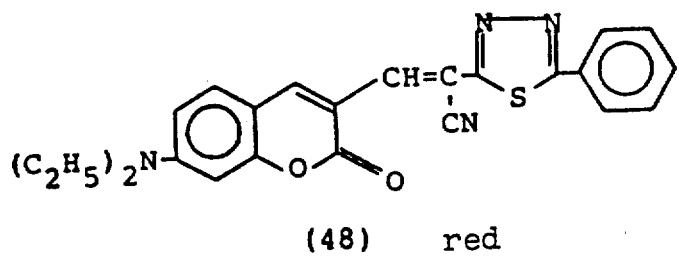
(48)  red
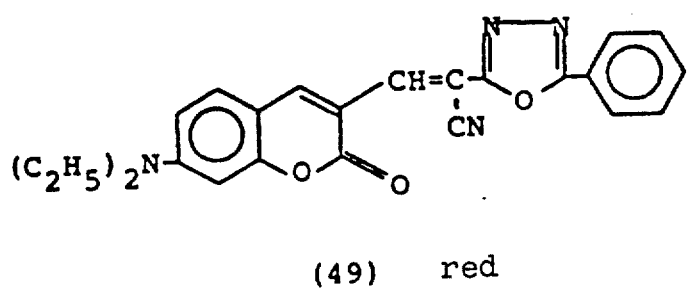
(49)  red